April 10, 1928.
R. H. DANE
FENDER GUARD PLATE
Filed July 13, 1927
1,665,492
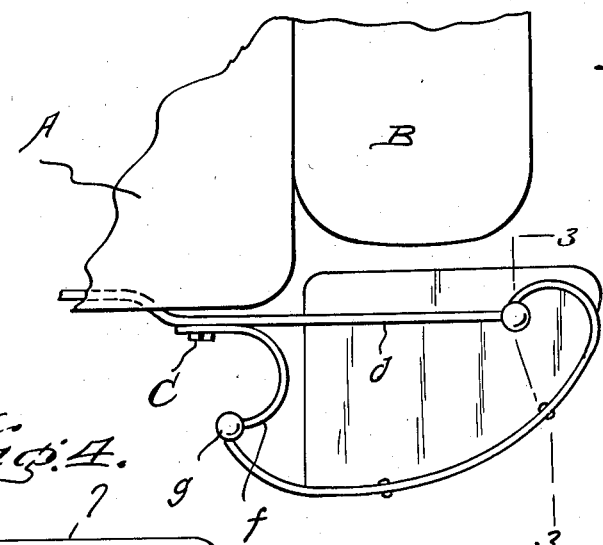
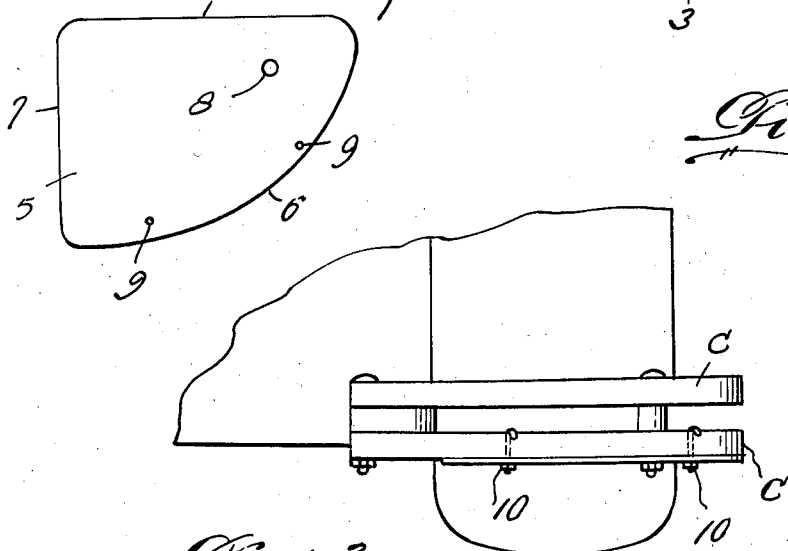
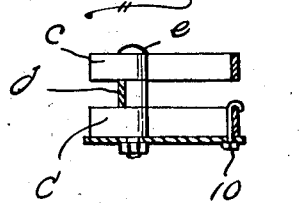
Inventor
Ralph H. Dane,
By Clarence A. O'Brien
Attorney Patented Apr. 10, 1928.

UNITED STATES PATENT OFFICE.

RALPH HAMILTON DANE, OF PORTLAND, MAINE.

FENDER-GUARD PLATE.

Application filed July 13, 1927. Serial No. 205,419.

This invention relates to new and useful improvements in guard plates for the rear fenders of automobiles and aims to provide a plate that is constructed for association with the end of a generally conventional bumper arranged at the rear of the automobile, and serves to prevent mud, tar, and the like from flying in an upward direction onto the ends of the fender.

One of the most important objects is the provision of a plate that may be readily attached to the end of the rear bumper or to the conventional bumperette without altering the construction of the bumper or bumperette, and without requiring much time and labor for installation.

In the drawings wherein like reference characters indicate corresponding parts in the several views:

Figure 1 is a fragmentary top plan of the end of an automobile at one side thereof equipped with a generally conventional bumper or bumperette which is in turn equipped with my improved guard plate.

Figure 2 is a rear elevation thereof.

Figure 3 is a section taken substantially on the broken line 3—3 of Figure 1, and Figure 4 is a plan view of the plate per se.

Now having particular reference to the drawings A designates fragmentarily the body of an automobile equipped at its rear end with the usual rear wheel fenders, one of which is disclosed and designated by the reference characters B, and which fender is protected by the adjacent end of a conventional bumper or bumperette C that usually consists of a pair of spaced parallel curved spring bars $c$—$c$, the outer ends of which are secured in conventional manner to the outer end of a horizontal bar $d$ by a bolt and nut connection $e$, the inner ends of the spring bars $c$—$c$ being connected to a small curved spring bar $f$ by a similar connection $g$. My invention per se consists of a generally triangular shaped metallic plate 5 formed with an outer curved edge 6 that merges into the ends of right angular straight edges 7—7, this curved edge 6 being of a curvature substantially equivalent to the curvature of the spring bars $c$—$c$ of the end of the bumper.

The plate 5 is arranged beneath the lowermost curved spring bar $c$, Figure 2, while the curved edge 6 of the plate is flush with the outer surface of said spring bar $c$, as clearly indicated in Figures 1, 2 and 3. The width of this plate 5 is such that the inner straight edge 7 will extend beyond the horizontal bar $d$ of the bumper or bumperette, while formed adjacent the right hand corner of this plate is an opening 8 for receiving the lower end of the bolt connection $e$ between the spring bars $c$—$c$ and the horizontal bar $d$, after which the usual nut is arranged thereon as disclosed in Figure 3. Furthermore, adjacent the curved edge 6 of the plate 5, said plate is provided with a pair of openings 9—9, to facilitate the attachment of the outer edge of the plate to the lowermost curved spring bar $c$ by hook bolts 10—10, which bolts extend upwardly and have their hooked ends engaged over the said spring bar.

It will thus be seen that the guard plate 5 will be arranged parallel with the road surface, and will act as a shield for the tail end of the fender B to prevent mud, oil, and other débris from flying upward and engaging upon said fender. In this connection attention is directed to the fact that the guard plate 5 extends a considerable distance beyond the bumper and to a point in close proximity with the fender B so that no débris or dirt can move past the plate 5 and get upon the back part of the fender or mud guard.

Having thus described the invention, what I claim is:—

In an automobile and in combination, a rear fender, a horizontally disposed bumper spaced in rear of said fender and having spaced rear and forward portions, and a horizontally disposed plate arranged below and against the rear and forward portions of the bumper and connected to the rear portion and extending forwardly of the forward portion of the bumper and to a point in close proximity to the fender.

In testimony whereof I affix my signature.

RALPH HAMILTON DANE.